(12) United States Patent
Vittitow et al.

(10) Patent No.: US 10,307,957 B2
(45) Date of Patent: Jun. 4, 2019

(54) APPARATUS AND METHOD FOR ADDITIVE MANUFACTURING

(71) Applicant: SIEMENS PRODUCT LIFECYCLE MANAGEMENT SOFTWARE INC., Plano, TX (US)

(72) Inventors: William Vittitow, Garden Grove, CA (US); David Madeley, Louth (GB); Timothy R. Fithian, Birmingham, MI (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 362 days.

(21) Appl. No.: 14/643,539

(22) Filed: Mar. 10, 2015

(65) Prior Publication Data

US 2016/0263833 A1    Sep. 15, 2016

(51) Int. Cl.
*B33Y 10/00* (2015.01)
*B33Y 30/00* (2015.01)
(Continued)

(52) U.S. Cl.
CPC ............ *B29C 64/00* (2017.08); *B22F 3/1055* (2013.01); *B29C 64/386* (2017.08); *B33Y 10/00* (2014.12); *B33Y 30/00* (2014.12); *B33Y 50/02* (2014.12); *B22F 2003/1056* (2013.01); *B22F 2003/1057* (2013.01); *B33Y 50/00* (2014.12); *Y02P 10/295* (2015.11)

(58) Field of Classification Search
CPC combination set(s) only.
See application file for complete search history.

(56) References Cited

U.S. PATENT DOCUMENTS

| 5,121,329 A | 9/1992 | Crump |
| 5,303,141 A | 4/1994 | Batchedlder et al. |

(Continued)

FOREIGN PATENT DOCUMENTS

| CN | 103691951 A | 4/2014 |
| CN | 103786342 A | 5/2014 |

(Continued)

OTHER PUBLICATIONS

"Jun. 2017: Interim eligibility Guidance Quick Reference Sheet" (from USPTO webpage).*

(Continued)

*Primary Examiner* — Austin Murata

(57) ABSTRACT

A component of a computer-aided manufacturing (CAM) system may be configured to cause a processor to generate instructions that specify how a 3D-printer additively builds an article on a build plate via depositing material from a deposition head. The 3D printer is configured to cause the deposition head to rotate in order to selectively change, an angle of a deposition axis at which the deposition head outputs material. The generated instructions specify how the deposition head is operated by the 3D printer to build the article on the build plate such that material deposited along a side wall surface of the article is provided by the deposition head having its deposition axis orientated at an angle determined based at least in part on an angular orientation of the side wall surface.

15 Claims, 5 Drawing Sheets

(51) Int. Cl.
  *B29C 64/00* (2017.01)
  *B22F 3/105* (2006.01)
  *B33Y 50/02* (2015.01)
  *B29C 64/386* (2017.01)
  *B33Y 50/00* (2015.01)

(56) References Cited

U.S. PATENT DOCUMENTS

| | | | |
|---|---|---|---|
| 6,027,326 | A | 2/2000 | Cesarano, III et al. |
| 6,401,795 | B1 | 6/2002 | Cesarano, III et al. |
| 7,168,935 | B1 * | 1/2007 | Tanninger .......... B23K 15/0073 219/121.12 |
| 2002/0008335 | A1 | 6/2002 | Leyden et al. |
| 2006/0003095 | A1 * | 1/2006 | Bullen .................... B22F 3/004 427/180 |
| 2011/0240607 | A1 | 10/2011 | Stecker et al. |
| 2014/0197576 | A1 * | 7/2014 | Kraibuhler .......... B29C 67/0059 264/308 |
| 2014/0265034 | A1 | 9/2014 | Dudley |
| 2014/0271964 | A1 * | 9/2014 | Roberts, IV ........ B29C 67/0088 425/150 |
| 2014/0284832 | A1 * | 9/2014 | Novikov ............. B29C 67/0088 264/40.1 |
| 2015/0183167 | A1 * | 7/2015 | Molinari ............. B29C 67/0088 425/167 |
| 2016/0074937 | A1 * | 3/2016 | Nassar .................. B22F 3/1055 419/53 |
| 2016/0172741 | A1 * | 6/2016 | Panat .................... B33Y 80/00 29/600 |
| 2017/0232518 | A1 * | 8/2017 | Shi ....................... B22F 3/1055 419/7 |

FOREIGN PATENT DOCUMENTS

| | | |
|---|---|---|
| CN | 104014791 A | 9/2014 |
| WO | 9612608 A2 | 5/1996 |
| WO | 2008083358 A1 | 7/2008 |
| WO | 2012171644 A1 | 12/2012 |
| WO | 2014014977 A2 | 1/2014 |
| WO | 2015019053 A1 | 2/2015 |

OTHER PUBLICATIONS

Manual, "Mastercam X Basic 30 Machining", Oct. 2010, pp. 1-120.
Kariuki, L.W. et al., "Generation and Optimization of Pocket Milling Tool Paths—A Review"; Proceedings of 2014 International Conference on Sustainable Research and Innovation, vol. 5, 2014, pp. 129-133.
Shamsuddin, Khairul Akmal et al.: "A Comparison of Milling Cutting Path Strategies for Thin-Walled Aluminium Alloys Fabrication" The International Journal of Engineering and Science (IJES), vol. 2, 2013, pp. 1-8.
Bichmann et al., "Automatisierte Reparatur-Fertigungszelle für den Werkzeugbau basierend auf optischer In-Prozess-Messtechnik und laserintegrierter Bearbeitung—OptoRep: Ergebnisbericht"; Fraunhofer-Institut für Produktionstechnik IPT, Aachen, Jun. 2006, pp. 1-53.
Zhang J. et al., "Laser Additive Manufacturing Process Planning and Automation", Proceedings of the 10th Annual Solid Freeform Fabrication Symposium, University of Texas Press 2000, pp. 243-250.
Ren L. et al.: "Three dimensional die repair using a hybrid manufacturing system", Department of Mechanical and Aerospace Engineering, Intelligent Systems Center, University of Missouri, Rolla, MO, 2006, pp. 52-59.
Ding D. et al.: "A tool-path generation strategy for wire and arc additive manufacturing", Faculty of Engineering and Information Sciences, 2014, pp. 1-18.
D.J. Claxton: "Development of a parametric software tool for the design and manufacturing of micro air vehicles", University of Florida, 2007, available online:http:ljufdcimages.uflib.ufl.edu/uf /e0/02/01/24/00001/claxton d.pdf, pp. 1-79.
Brecher C. et al.: "Machine tool for the automated repairing of worn-out moulds and dies with integrated 3D-measuring system and an adaptive two-axis-laser-cladding-head", Projekt "OptoRep", 4th International Conference on Laser Assisted Ne Shape Engineering (LANE), Erlangen, Germany, Sep. 2004, pp. 1-14.
Ding, Donghong et al, "A practical path planning methodology for wire and arc additive manufacturing of thin-walled structures", Robotics and Computer-Integrated Manufacturing, vol. 34, 2015, pp. 8-19.
Notice of Opposition to a European Patent, dated Oct. 17, 2018, EP Application No. 16159384.3, 45 pgs.

* cited by examiner

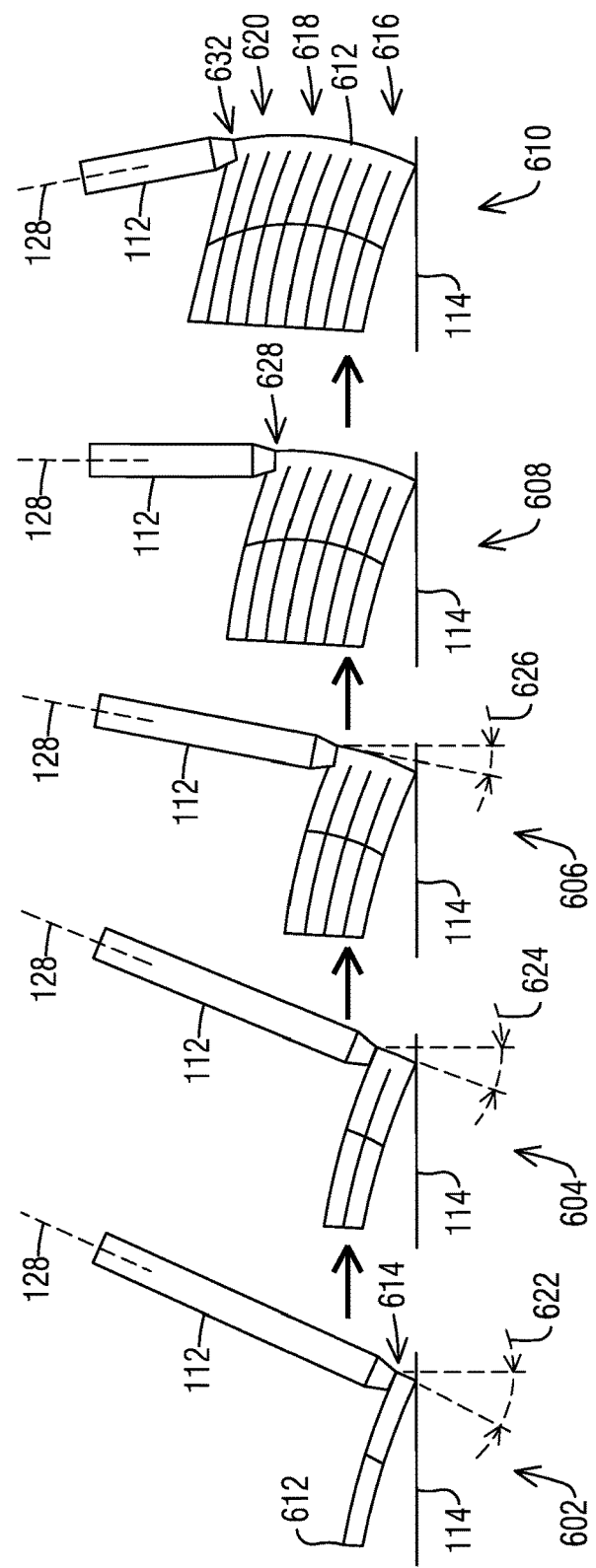

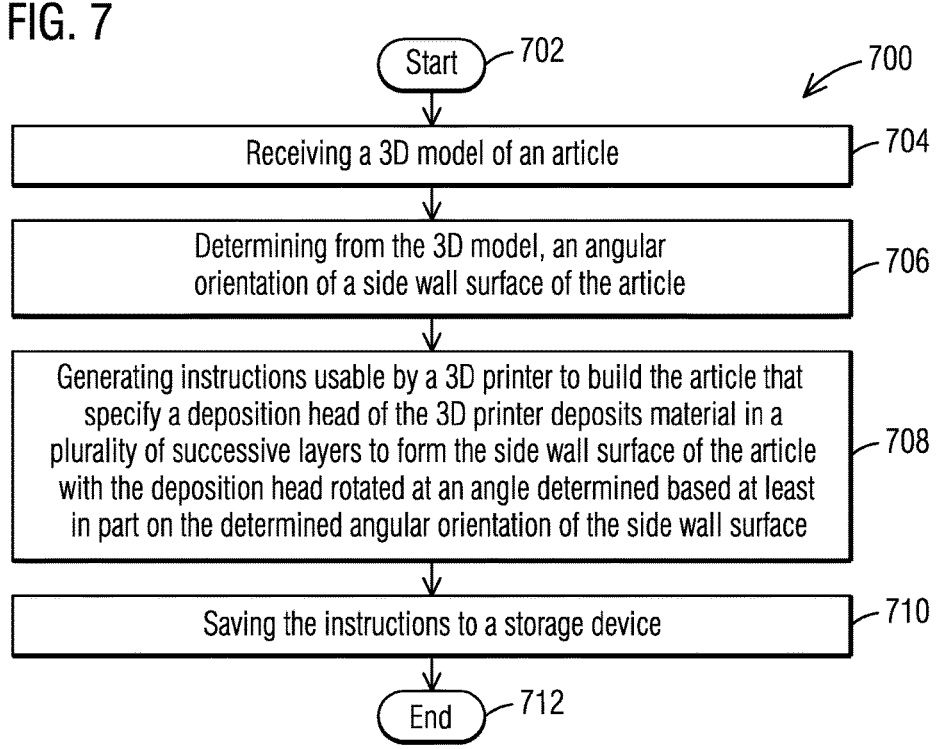
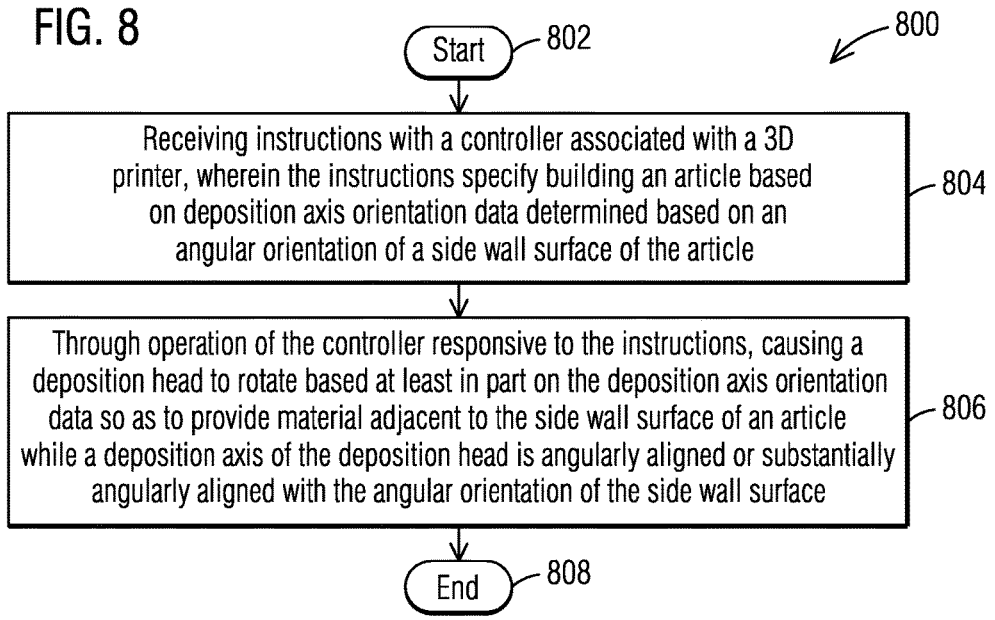

US 10,307,957 B2

APPARATUS AND METHOD FOR ADDITIVE MANUFACTURING

TECHNICAL FIELD

The present disclosure is directed, in general, to computer-aided design (CAD) systems, computer-aided manufacturing (CAM) systems, computer-aided engineering (CAE) systems, product lifecycle management ("PLM") systems, and similar systems, that manage data for products and other items (collectively, "Product Data Management" systems or PDM systems).

BACKGROUND

Additive manufacturing (also referred to as 3D printing) involves processes for the production of three-dimensional (3D) articles through the incremental depositing and bonding of materials. Additive manufacturing may benefit from improvements.

SUMMARY

Variously disclosed embodiments include methods and systems for enabling users of CAM systems and 3D printers to produce 3D articles via an additive manufacturing process. In one example, an apparatus for additive manufacturing comprises at least one processor operatively configured to generate instructions usable by a 3D printer to build an article that specify that a deposition head of the 3D printer deposits material in a plurality of successive layers to form a side wall surface of the article with the deposition head rotated at an angle determined based at least in part on an angular orientation of the side wall surface.

In another example, a method for additive manufacturing comprises generating instructions usable by a 3D printer to build an article that specify that a deposition head of the 3D printer deposits material in a plurality of successive layers to form a side wall surface of the article with the deposition head rotated at an angle determined based at least in part on an angular orientation of the side wall surface.

A further example may include, a non-transitory computer readable medium encoded with executable instructions (such as a software component on a storage device) that when executed, causes at least one processor to carry out this describe method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 6 illustrates an example angular transition of a deposition head between different portions of a curved surface at different layers along the same side wall of an article being built.

FIGS. 7 and 8 illustrate flow diagrams of example methodologies that facilitate additive manufacturing.

DETAILED DESCRIPTION

Figure 1:
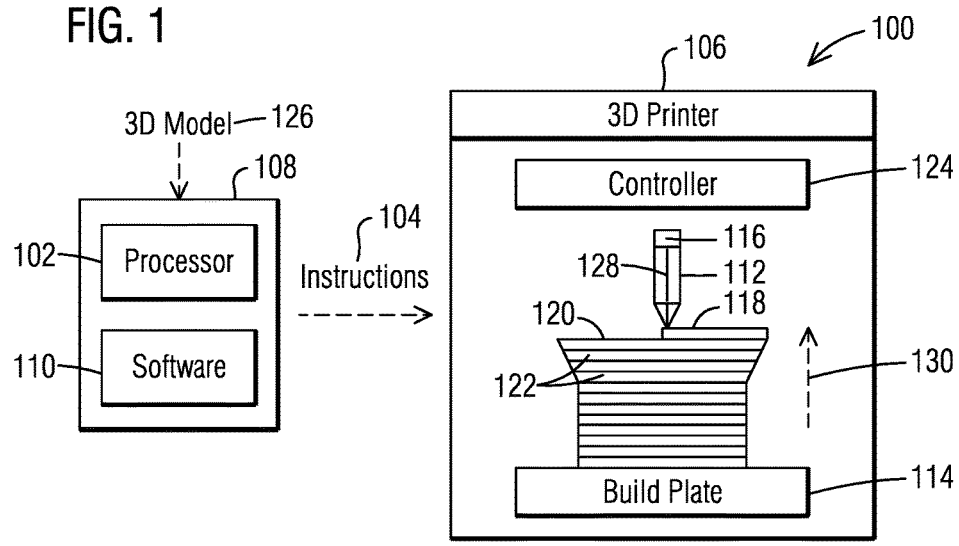
FIG. 1 illustrates a functional block diagram of an example system that facilitates additive manufacturing.

Various technologies pertaining to additive manufacture will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system components may be performed by multiple components. Similarly, for instance, a component may be configured to perform functionality that is described as being carried out by multiple components. The numerous innovative teachings of the present application will be described with reference to exemplary non-limiting embodiments.

With reference to FIG. 1, an example system 100 that facilitates additive manufacturing is illustrated. Examples of additive manufacturing processes include fused deposition modeling, fused filament fabrication, robocasting, electron beam freeform fabrication, direct metal laser sintering, electron-beam melting, selective laser melting, selective heat sintering, selective laser sintering, and stereolithography. Many of these processes involve depositing and melting/ softening/bonding materials in selective locations layer by layer to build up the desired 3D article. A non-exhaustive list of example materials that may be used in additive manufacturing includes metals, thermoplastics and ceramics.

Additive manufacturing processes typically employ machines specifically configured to carry out their respective processes, which are generally referred to as 3D printers or additive machines. However, it should be appreciated that some 3D printers may further be capable of machining/subtractive processes as well and correspond to hybrid additive/subtractive machines. An example of a hybrid additive/subtractive machine that may be used to carry out examples described herein includes the Sauer & DMG Mori Lasertech 65. However, it should be noted that other types of 3D printers may be operative to build an article based on the features/processes/instructions described herein. As used herein, machines capable of at least additive processes (which may or may not include subtractive processes) are referred to as 3D printers.

In an example embodiment, the system 100 includes at least one processor 102 operatively configured to generate instructions 104 usable by a 3D printer to control the operation of the 3D-printer in order to build an article via at least additive manufacturing. In an example embodiment, one or more data processing systems 108 (external to the 3D-printer) may include the at least one processor 102. For example, an external data processing system may correspond to a workstation having various software components (e.g., programs, modules, applications) 110.

The software components 110 may be operatively configured to cause the at least one processor 102 to carry out the functions and acts described herein to build the instructions 104. In an example embodiment, the instructions 104 may have a G-code format or other numerical control (NC) programming language format. Examples of G-code formats include formats confirming to standards such as RS-274-D, ISO 6983, and DIN 66025.

Example embodiments described herein may involve a 3D printer having a deposition head 112 and a build plate 114. In example embodiments, the deposition head 112 may include an integrated heat source 116 such as a laser (or electrode) that is operative to melt/soften material 118 such as powdered metal (or metal wire) that is provided from the deposition head.

The 3D printer 106 is operative to build an article 120 up from the build plate 114 via depositing layer on top of layer 122 of material 118 in a build direction 130. The deposition head 112 in this example may be operative to simultaneously output and melt/soften a continuous flow of material that bonds to the build plate and/or previously applied layers that make up the article. In this described example the material may correspond to metal (in a powder or wire form). However, it should be appreciated that in alternative embodiments, 3D printers operative to deposit other types of material such as thermoplastics may be adapted for use with the systems and processes described herein.

In an example embodiment, the 3D printer may be operative to move the deposition head horizontally (in X-Y directions) and vertically (in Z directions). In some embodiments the type of 3D printer may also be operative to move the build plate (such as by rotating the build plate with respect to one or more different axes).

Further, an example 3D printer may not just output material vertically downwardly (or perpendicular to the plane of the build plate), but may rotate the deposition head 112 relative to the Z axis in order to output material at an angle relative to vertical (or at an angle relative to perpendicular to the plane of the build plate).

Thus, the 3D printer may be operable to move the print head and/or the build plate relative to each other to deposit beads of material in patterns that build up the article or a portion of the article in layers outwardly from the build plate (such as in a build direction 130) or outwardly from a portion of the article (in a build direction that may or may not be perpendicular to the build plate 114). For example, the generated instructions 104 may specify that an article being built rotates (via rotating the build plate) so that a side wall of the article faces upwardly. In this example, the generated instructions may specify that additional portions of the article are built upwardly from the side wall of the article in a build direction that is at an angle to the build plate (such as parallel to the build plate rather than perpendicular to the build plate).

Referring back to FIG. 1, it should be noted that layers deposited based on the instructions generated by the processor may be planar. However, it should be appreciated that layers may not be planar but may be curved or have other non-planar contours.

In an example embodiment, the 3D printer may include a controller 124 that is operatively configured to actuate hardware components (e.g., motors, electrical circuits and other components) of the 3D printer in order to selectively move the deposition head and/or the build plate in order to deposit material in the various patterns describe herein.

Such a controller 124 may include at least one processor that is operative responsive to software and/or firmware stored in the 3D printer to control the hardware components of the 3D printer (e.g., the deposition head and heat source). Such a controller may be operative to directly control the hardware of the 3D printer by reading and interpreting the generated instructions 104.

In an example embodiment, such instructions may be provided to or acquired by the controller over a network connection. In such examples, the controller 124 may include a wired or wireless network interface component operative to receive the instructions. Such instructions 104 may come directly from the data processing system 108 over the network. However, in other examples, the instructions 104 may be saved by the data processing system on an intermediate storage location (such as a file server) which is accessible to the 3D printer.

It should also be appreciated that the 3D printer may include an input device such as a card reader or a USB port that is operative to enable the controller to read the instructions stored on a portable medium such as a flash memory card or drive. In another example, the 3D printer may be connected to the data processing system 108 via a USB cable and receive the instructions 104 and other communications from the data processing system through a USB connection.

Also, in an example embodiment, the data processing system 108 may be a distributed system, in which one data processing system and/or software component generates first instructions in one type of format while a second data processing system and/or software component is operative to post-processes the first instructions into second instructions in a format such as G-code or other format that is compatible with the particular 3D printer used to generate the article.

In an example embodiment the software 110 is operate to receive a 3D model 126 of the article and generate the instructions 104 based on the 3D model 126 of the article. In an example, the software may include a CAM software component that facilitates the generation of the instructions 104 from a 3D model. Such a 3D model for example may correspond to a CAD file in a format such as STEP or IGES. In an example embodiment, the software components 110 may include a CAD/CAM/CAE software suite of applications such as NX that is available from Siemens Product Lifecycle Management Software Inc. (Plano, Tex.).

In addition to generating G-Code for a 3D model, an example CAM software component may also be configured to cause the data processing system to output a visual representation of the article 120 on a display screen in operative connection with the processor based on the 3D model. In addition, the CAM component may be configured cause the data processing system to provide a graphical user interface for use with providing inputs from an input device of parameters usable to generate the instructions 104 for building the article.

Such user provided parameters may include the build direction(s) to be associated with the article (or various portions of the article), the thickness and width of each bead of deposited material, the speed that the material is deposited, the patterns that the head travels relative to the build plate to deposit material to the article, as well any other parameters that define characteristics for the operation of a 3D printer.

Figure 2:
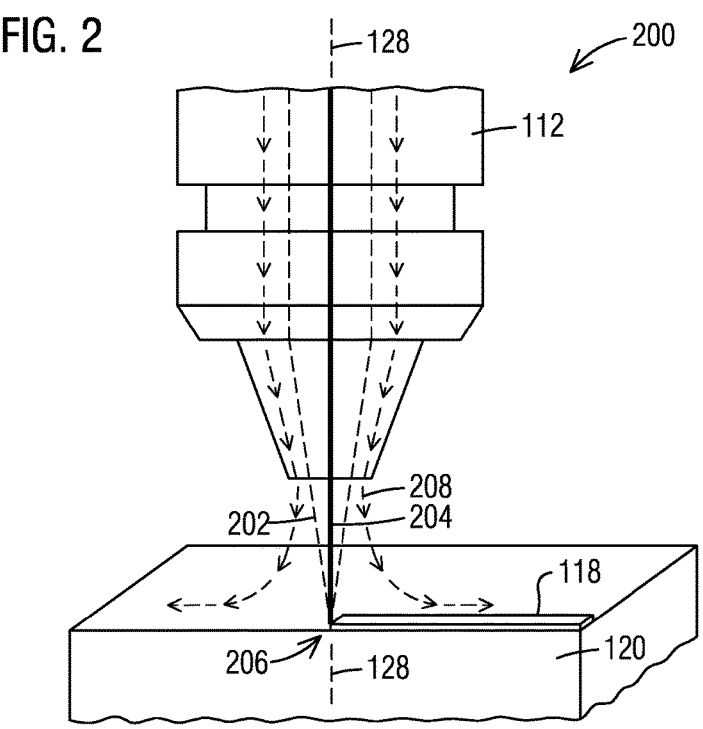
FIG. 2 illustrates a schematic view of an example deposition head of an example 3D printer.

Referring now to FIG. 2, an example configuration 200 of a deposition head 112 is illustrated that is operative to output both depositing material 202 and heat energy 204 needed to melt/soften the material. In this example, the heat energy 204 may correspond to laser light emitted by a laser mounted in the deposition head. The material 202 provided by the deposition head may correspond to a flow of powdered metal that is directed (via the tip design of the deposition head) to flow and intersect with the laser light at the position where a deposited layer 118 of material is desired to be placed on the article 120. In addition it should be noted that the deposition head 112 may be operative to provide a surrounding jet 208 of inert shielding gas that minimizes oxidation of the material in the feed stream from the deposition head.

In this example the deposition head may be operative to deposit a bead of material that ranges from 0.1 to 1.5 mm or larger in thickness (in the build direction) and ranges from 0.1 to 4 mm or larger in width. However, it should be appreciated that different deposition heads and different additive processes may include other ranges of dimensions for the beads of material that are deposited to build up an article.

In the example shows in FIG. 2, the deposition head includes a deposition axis 128 coincident with the laser light 204 and which is parallel to the overall direction that the powdered material 202 is outputted from the deposition head. In particular, as shown in FIG. 2, it should be noted that the powdered material 202 flows in a conical pattern towards an intersection position 206 with the laser light 204. The axis of the conical pattern corresponds to the average or overall direction that powdered material is outputted from the deposition head, and corresponds to the deposition axis 128 described herein.

In an alternative embodiment, in which the material provided by the deposition is a metal wire (melted/softened via an electron beam for example), the longitudinal axis of the metal wire feeding from the deposition head corresponds to the deposition axis. Similarly for 3D printers which output extruded material, the direction the extruded material is outputted from the deposition head corresponds to the deposition axis.

Figure 3:
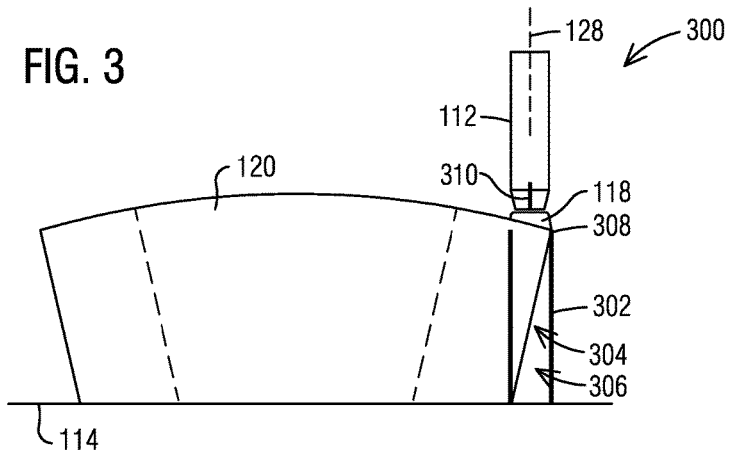
FIG. 3 illustrates an example of how material may be wasted when building an overhanging side wall surface.

It should be noted that the configuration of the geometry of an article may cause a 3D printer to waste some of the material that is outputted from a deposition head of the 3D printer. FIG. 3 illustrates an example 300 of how material 302 may be wasted when building an overhanging side wall surface 304 of an article 120.

As used herein, a side wall surface corresponds to a wall surface that extends along the article in a build direction (such as between the build plate and an upper surface on which layers of material are being deposited). Also, as used herein, overhanging side wall surfaces are side wall surfaces that face at least partially away from the build direction (such as toward the build plate 114), and thus are associated with open space 306 vertically between the wall surface and the build plate (or another portion of the article).

In this example, material (such as a metal powder) outputted by the deposition head 112 (orientated vertically) near an edge of the overhanging side wall surface, may flow past the top edge 308 and fall to the build plate 114. In further situations, portions of laser light 310 from the deposition head 112 may melt/soften some of the powder flowing past the edge. Such melted/softened material could also become undesirably stuck to the side wall surfaces of the article.

As discussed previously, in an example embodiment, the 3D printer may be capable of causing the deposition head 112 to rotate (away from vertical). This may be done in order to selectively change, (relative to an overall build direction or build plate 114), an angle of the deposition axis 128 at which the deposition head outputs material. By selectively adjusting the angle of the deposition axis (in the coordinate system of the 3D-printer), an example embodiment may be operative to prevent or at least minimize the loss of material along the sides of overhanging side wall surface.

Figure 4:
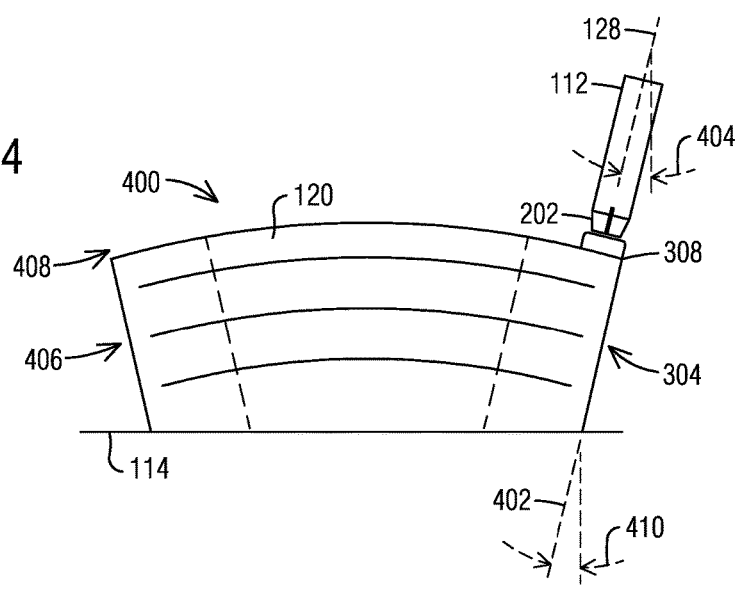
FIG. 4 illustrates an example of how wasted material may be minimized when building an overhanging side wall surface.

FIG. 4 illustrates an example 400 in which the deposition head 112 is angularly orientated by the 3D printer in this manner. In this example, the deposition head is rotated so that the deposition axis 128 is positioned to be generally angularly aligned with the angular orientation 402 of the overhanging side wall surface.

As discussed previously, a software component such as a CAM software application (executing in a processor of a data processing system) may be configured to generate instructions that control the operation of a 3D printer, and in particular control the relative motions of the deposition head and/or build plate in order to deposit successive layers of material that form an article.

To achieve the alignment shown in FIG. 4, the processor 102 may be operative (e.g., via the execution of a CAM software component by the processor) to generate such instructions 104 which additionally specify the angular rotation of the deposition head 112 such that the material 202 outputted from the deposition head along an overhanging side wall surface 304 of the article 120 is provided by the deposition head rotated at an angle 404 (relative to a direction perpendicular to the build plate 114 or other reference direction) based at least in part on an angular orientation 402 at which the overhanging side wall surface 304 extends relative to the build plate 114.

In this example, the instructions generated by the processor specify that the deposition head rotates so that its deposition axis 128 is generally aligned with the angular orientation 402 of the wall surface. Such an alignment may correspond to the deposition axis being parallel with the overhanging side wall surface 304. However, it should be appreciated that in example embodiments, the instructions may specify that the deposition head rotates so that the deposition axis is substantially parallel with the overhanging side wall surface to which material is being deposited. In an example, substantially parallel or generally aligned may correspond to the deposition axis being within 10 degrees of being parallel with the overhanging side wall surface 304. However, it should be appreciated that the deposition axis may be orientated at other angles in view of the orientation of the overhanging side wall surface based at least in part on the particular geometry of the article, orientation of the build plate, and the type of additive system employed to deposit the material.

In FIG. 4, the overhanging side wall surface 304 is depicted as extending in a straight line from a position adjacent (i.e., directly below) the deposition head to the build plate. Thus, the angular orientation 402 of the overhanging side wall surface may correspond to a constant angle 410 by which the straight overhanging side wall surface (vertically below the deposition head 112) tapers relative to a direction perpendicular to the build plate 114 (or other reference direction). However, it should be appreciated that in some embodiments the overhanging side wall surface below the deposition head may not be straight, but may be curved, wavy, or have other contours that jut inwardly (and outwardly) from the top edge 308 of the article 120.

In such cases the described angular orientation of the overhanging side wall surface may correspond to an angle associated with at least one of the downwardly and inwardly directed wall surfaces and/or an angle that approximately depicts the overall downward and inward taper of the overhanging side wall surface below the top edge 308. Such an approximation for the angular orientation of the overhanging side wall surface may for example correspond to an average of two or more angles of portions of the wall surface.

In another example, where the wall surface is curved, the determined angular orientation may correspond to determining an angle of a direction that is tangent to a curved surface adjacent to the upper edge of the layer being deposited. However, it should be appreciated that alternative embodiments may use any other calculation that is capable of representing a geometric taper of a wall surface that is useful for basing the angle to orientate the deposition axis for purposes of minimizing wasted material (or other purposes such as enhancing a smoothness of a wall).

FIG. 4 illustrates an example of the deposition axis being angularly orientated at a first angle 404 based at least in part on a first angular orientation 404 of the overhanging side wall surface 304. However as shown in FIG. 4, the article may include a second (or more) overhanging side wall surface(s) 406 that are spaced apart from the first overhanging side wall surface 304, but are also in the same layer(s) 408 deposited by the deposition head.

Figure 5:
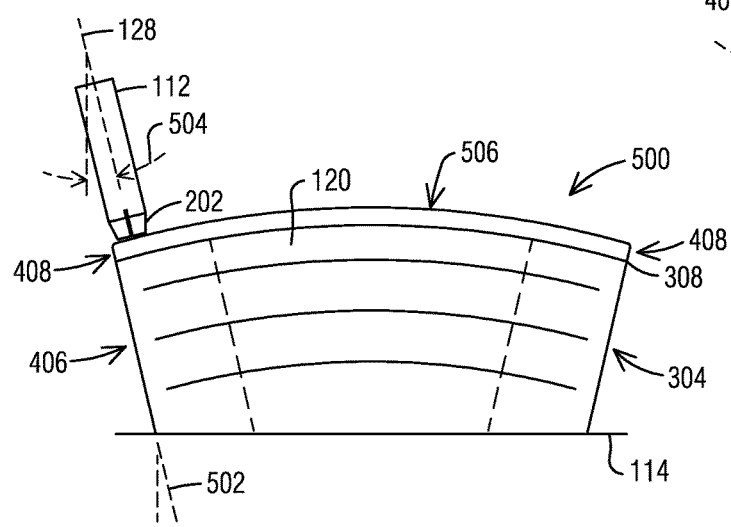
FIG. 5 illustrates an example angular transition of a deposition head between first and second side surfaces in a common layer.

As illustrated in the example 500 shown in FIG. 5, the instructions for controlling the 3D printer may be generated (via the execution of a CAM software component by the processor) such that material deposited along the second overhanging side wall surface 406 of the article 120 is provided by the deposition head 112 having its deposition axis 128 angularly orientated at a second angle 504 based at least in part on a second angular orientation 502 at which the second overhanging side wall surface 406 extends relative to the build plate 114. As illustrated in FIGS. 4 and 5, the first and second angles 404, 504 are different and are not parallel to each other.

In order to enable the deposition head to smoothly and continuously deposit the layer 408, the instructions for controlling the 3D-printer may be generated (e.g., via the execution of a CAM software component by the processor) such that material 506 deposited between the first and second overhanging side wall surfaces 304, 406, for the same layer that includes the first and second overhanging side wall surfaces, and in between the time periods when material is deposited at the first and second overhanging side wall surfaces, is provided by the deposition head while the deposition axis of the deposition head transitions from the first angle 404 to the second angle 504.

By smoothly rotating the deposition head 112 while continuously depositing material between the overhanging side wall surfaces, the layer may be deposited more uniformly across the portions of the layer between the first and second overhanging side wall surfaces. Further a smooth angular transition between overhanging side wall surfaces may avoid cycling off/on the heat source and the output of material by the deposition head, which may reduce the amount of time necessary to build the article.

In addition, the instructions may be operative to cause the 3D printer to provide a smooth angular transition of the deposition head along wall surfaces in different layers (e.g., from a first layer to a second (or more) layer(s) that is/are outwardly of the first layer relative to the build plate). For example, FIG. 6 depicts a series of views 602-610 of an article 612 as layers are successively being added to build up the article over time. In this example, the outer side wall 614 of the final article 612 in view 610 is generally convex with lower portion layers 616 (closer to the build plate) that correspond to an overhanging surface, with mid portion layers 618 that are generally perpendicular to the build plate and upper portion layers 620 that are not inclined but rather extends outwardly from the final upper edge 632.

In view 602 the lower portion of the side wall 614 is steeply inclined. Thus, the instructions generated to build the article 612 specify that the deposition axis has a corresponding steep angle 622 with respect to the build plate 114. However, for each additional layer the instructions are generated based at least in part on a determined change in slope of the convexly shaped side wall 614 to incrementally change the angle of the deposition axis 128 of the deposition head 112 so as to be generally aligned with the geometry of the wall surface that is adjacent to the current layer being deposited along the current edge of the wall surface. Thus in views 604 and 606 the angles 624 and 626 are sequentially less steep than the angle 622 in view 602.

In these examples, because the side wall 614 is curved, the processor generating the instructions may interpolate corresponding angles to rotate the deposition axis 128 of the deposition head 112 based at least in part on the slope of the curve at various locations along the wall surface. Also, the instructions may direct the 3D printer to align the disposition axis with directions that are tangent to the portions of the wall surface adjacent to the current edge of the layer being deposited.

Also as depicted in views 608, 610, example embodiments may also be operative to continue to rotate the deposition head for layers having adjacent wall surfaces that are no longer inclined but rather extend outwardly from the corresponding edges 628, 632 where material is being deposited. Aligning the deposition axis in this manner may be operative to produce a relatively smoother wall surface in view 610 than would be achievable if the deposition axis had remained vertical when adding layers from views 602 to 610.

In an example embodiment, in order to cause a deposition head to rotate to a particular angle, the processor 102 may be configured (e.g., via software) to the generate instructions that include deposition axis orientation data along with the particular data that specifies the path that a deposition head moves relative to a build plate. Such deposition axis data may specify the particular angle to rotate the deposition head in the coordinate system associated with the 3D printer being controlled with the generated instructions. As discussed previously, the generated instructions may be in a G-code format or other format capable of being used by the 3D-printer to control how the 3D-printer builds an article.

In the examples illustrated above, the example processor 102 may be implemented in a data processing system that is separate from the 3D printer (such as in a workstation running a CAM software component). However, it should be noted that in an alternative embodiment, the controller 124 of the 3D printer may include the processor that generated the instructions.

In this alternative example, the 3D printer may generate the instructions (having the deposition axis data that specifies angles to rotate the deposition head) by modifying received instructions for generating an article in which the angular orientation of the deposition axis is not specified.

In this alternative example, the processor in the controller may be operative to determine the angles to rotate the head based at least in part on angular orientations of side wall surfaces, which angular orientations of such side wall surfaces are determined (approximately) by analyzing the received instructions (e.g. which may be in a G-code format). In further alternative embodiments, the 3D printer may be operative to determine angular orientations of the side wall surfaces (in order to determine how to rotate a deposition head) via optical data (such as from cameras capturing images of the article being built) or via other sensors that provide data that depicts the geometry of the side walls of the article being built.

With reference now to FIGS. 7 and 8, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or signal bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 7, a methodology 700 that facilitates additive manufacturing is illustrated. The methodology 700 begins at 702, and at 704 the methodology includes the act of receiving a 3D model of an article. At 706 the methodology includes the act of determining from the 3D model, an angular orientation of a side wall surface of the article. In addition, at 708 the methodology includes the act of generating instructions usable by a 3D printer to build the article that specify that a deposition head of the 3D printer deposits material in a plurality of successive layers to form the side wall surface of the article with the deposition head rotated at an angle based at least in part on the determined angular orientation of the side wall surface. Further at 710 the methodology includes the act of saving the instructions to a storage device. At 712 the methodology may end.

As discussed previously, such acts may be carried out by at least one processor. Such a processor may be included in a data processing system for example that executes a software component operative to cause these acts to be carried out by the at least one processor.

Referring to FIG. 8, another methodology 800 that facilitates additive manufacturing is illustrated. This methodology 800 begins at 802, and at 804 the methodology includes the act of receiving instructions with a controller associated with a 3D printer, wherein the instructions correspond to the instructions generated or saved in the previously described methodology 800 (e.g., the instructions specify building the article based on deposition axis orientation data determined based on an angular orientation of a side wall surface of the article). At 806, the methodology includes the act of through operation of the controller responsive to the instructions, causing a deposition head to rotate based at least in part on the deposition axis orientation data so as to provide material adjacent to the side wall surface of an article while a deposition axis of the deposition head is angularly aligned or substantially angularly aligned with the angular orientation of the side wall surface. At 808 the methodology may end.

As discussed previously, such acts may be carried out by at least one processor in the controller. Such a processor for example may execute a software component operative to cause these acts to be carried out by a 3D printer.

Figure 9:
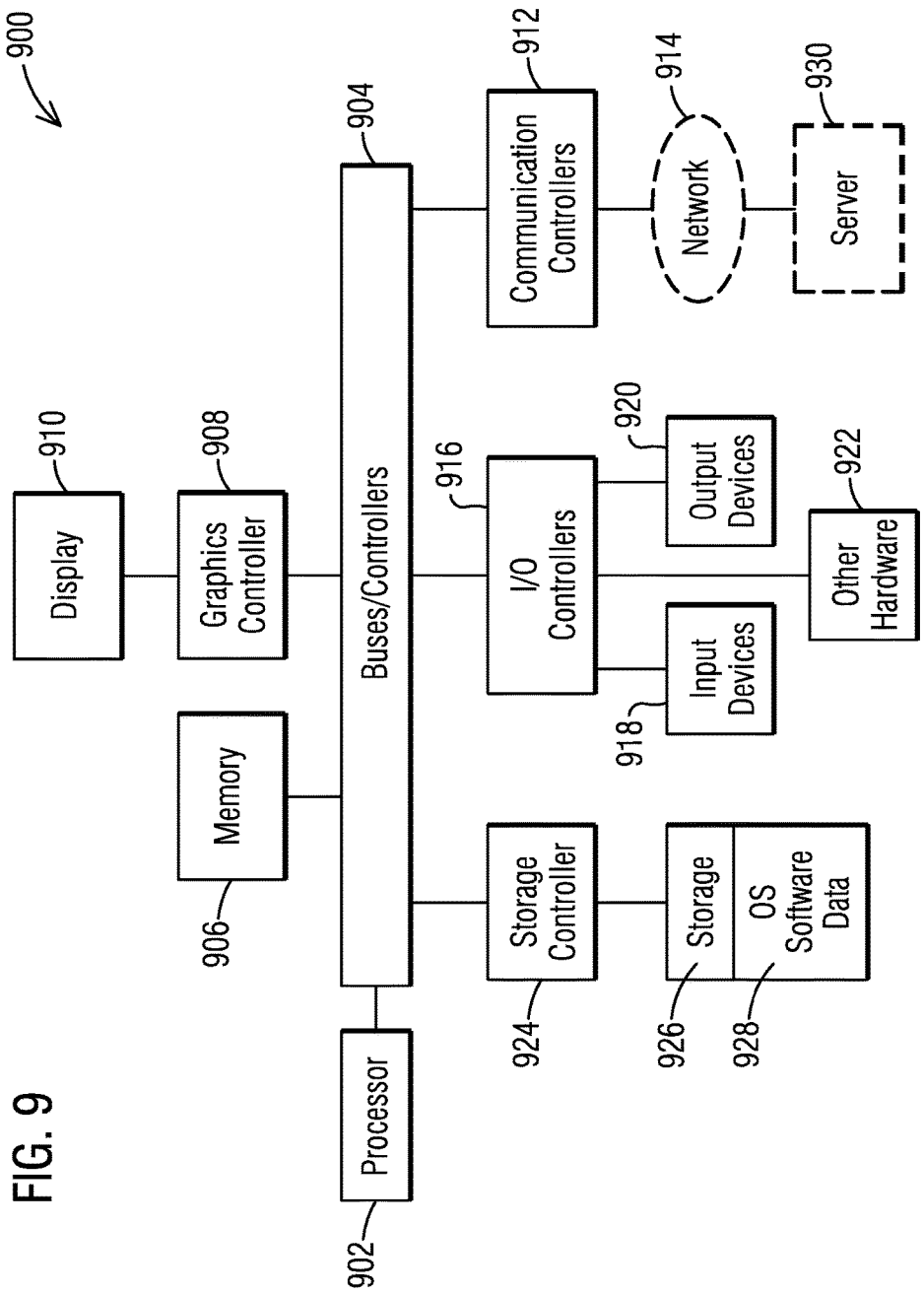
FIG. 9 illustrates a block diagram of a data processing system in which an embodiment can be implemented.

FIG. 9 illustrates a block diagram of a data processing system 900 (also referred to as a computer system) in which an embodiment can be implemented, for example as a portion of PDM system operatively configured by software or otherwise to perform the processes as described herein, and in particular as each one of a plurality of interconnected and communicating systems as described herein. The data processing system depicted includes at least one processor 902 (e.g., a CPU) that may be connected to one or more bridges/controllers/buses 904 (e.g., a north bridge, a south bridge). One of the buses 904 for example may include one or more I/O buses such as a PCI Express port bus. Also connected to various buses in the depicted example may include a main memory 906 (RAM) and a graphics controller 908. The graphics controller 908 may be connected to one or more displays 910. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 912 (Ethernet controllers, WiFi controllers, Cellular controllers) operative to connect to a local area network (LAN), Wide Area Network (WAN), a cellular network, and/or other wired or wireless networks 914 or communication equipment.

Further components connected to various busses may include one or more I/O controllers 912 such as USB controllers, Bluetooth controllers, and/or dedicated audio controllers (connected to speakers and/or microphones). It should also be appreciated that various peripherals may be connected to the USB controller (via various USB ports) including input devices 918 (e.g., keyboard, mouse, touch screen, trackball, camera, microphone, scanners), output devices 920 (e.g., printers, speakers) or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware 922 connected to the I/O controllers 914 may include any type of device, machine, or component that is configured to communicate with a data processing system.

Additional components connected to various busses may include one or more storage controllers 924. A storage controller may be connected to one or more storage drives, devices, and/or any associated removable media 926, which can be any suitable machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and media.

Also, a data processing system in accordance with an embodiment of the present disclosure may include an operating system, software, firmware, and/or other data 928 (that may be stored on a storage device 926). Such an operation system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through the pointing device. The position of the cursor/pointer may be changed and/or an event, such as clicking a mouse button, may be generated to actuate a desired response. Examples of operating systems that may be used in a data processing system may include Microsoft Windows, Linux, UNIX, iOS, and Android operating systems.

The communication controllers 912 may be connected to the network 914 (not a part of data processing system 900), which can be any public or private data processing system network or combination of networks, as known to those of skill in the art, including the Internet. Data processing system 900 can communicate over the network 914 with one or more other data processing systems such as a server 930 (also not part of the data processing system 900). Thus a described data processing system may be implemented as part of a distributed system in which processors associated with several devices may be in communication by way of a network connection and may collectively perform tasks described as being performed by a single data processing system. It is to be understood that when referring to a data processing system, such a system may be implemented across several data processing systems organized in a disturbed system in communication with each other via a network.

In addition, it should be appreciated that data processing systems may be implemented as virtual machines in a virtual machine architecture or cloud environment. For example, the processor 902 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example the data processing system 900 in this example may correspond to a desktop PC, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 900 may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:
1. An apparatus for additive manufacturing comprising:
at least one processor operatively configured to:
generate instructions usable by a 3D printer to build an article that specify that a deposition head of the 3D printer deposits material in a plurality of successive layers to form a first side wall surface and a second side wall surface of the article, wherein the first side wall surface is different from the second side wall surface, such that the at least one processor is configured to:
receive a 3D model of the article;
determine a first angular orientation of the first side wall surface of the article from the 3D model as an average of two or more angles at portions of the first wall surface;
determine portions of the generated instructions effective for rotating a deposition axis of the deposition head of the 3D printer at a first angle to provide material adjacent to the first side wall surface based at least in part on the determined first angular orientation;
determine a second angular orientation of the second side wall surface of the article from the 3D model;
determine portions of the generated instructions effective for rotating the deposition axis of the deposition head of the 3D printer at a second angle to provide material adjacent to the second side wall surface based at least in part on the determined second angular orientation, wherein the first and second angles are different; and
determine portions of the generated instructions effective for rotating the deposition axis of the deposition head of the 3D printer at intermediate angles between the first angle and the second angle to deposit material along a deposition path between the first and second side wall surfaces that is not a wall surface, based at least in part on interpolating between the first angle and the second angle for positions along the deposition path between the first and second side wall surfaces, and such that the deposition head of the 3D printer continuously deposits material along the deposition path from the first side wall surface, to between the first and second side wall surfaces, and to the second side wall surface at the first angle, the intermediate angles, and the second angle respectively.

2. The apparatus according to claim 1, further comprising at least one data processing system that comprises the at least one processor and at least one memory, wherein the at least one data processing system is external to the 3D printer and includes at least one software component that executes in the at least one processor from the memory and causes the at least one processor to generate the instructions based at least in part on a 3D model of the article.

3. The apparatus according to claim 2, further comprising the 3D printer, wherein the 3D printer includes the deposition head, a build plate on which the article is built, and a controller that is operative to selectively move and rotate the deposition head responsive to the instructions, wherein the controller is operatively configured to cause the deposition head to rotate based on the generated instructions, wherein the material is at least one of a powdered metal, a metal wire, or a combination thereof, wherein the 3D printer includes at least one heat source that bonds the deposited material together via at least one of laser light, electron beams, or a combination thereof.

4. The apparatus according to claim 2, wherein the instructions include G-code instructions.

5. The apparatus according to claim 1, wherein the instructions generated by the at least one processor specify a plurality of successive layers for which material is applied to build the article, wherein the first side wall surface is positioned in the same layer as the second side wall surface.

6. The apparatus according to claim 1, wherein the instructions generated by the at least one processor specify a plurality of successive layers for which material is applied to build the article, wherein the first side wall surface is positioned in a first layer and the second side wall surface is positioned in a second layer that is positioned outwardly of the first layer relative to the build plate.

7. The apparatus according to claim 1, wherein the instructions generated by the at least one processor specify how the deposition head is operated by the 3D printer to build the article such that the material deposited along the first side wall surface of the article is provided by the deposition head having its deposition axis orientated within 10 degrees of being parallel to the first side wall surface.

8. The apparatus according to claim 7, wherein the instructions generated by the at least one processor specify how the deposition head is operated by the 3D printer to build the article such that the material deposited along the first side wall surface of the article is provided by the deposition head having its deposition axis orientated parallel to the first side wall surface.

9. A method for additive manufacturing comprising:
through operation of at least one processor:
generating instructions usable by a 3D printer to build an article that specify that a deposition head of the 3D printer deposits material in a plurality of successive layers to form a first side wall surface and a second side wall surface of the article, including:
receiving a 3D model of the article;
determining a first angular orientation of the first side wall surface of the article from the 3D model as an average of two or more angles at portions of the first wall surface;
determining portions of the generated instructions effective for rotating a deposition axis of the deposition head of the 3D printer at a first angle to provide material adjacent to the first side wall surface based at least in part on the determined first angular orientation;
determining a second angular orientation of the second side wall surface of the article from the 3D model;
determining portions of the generated instructions effective for rotating the deposition axis of the deposition head of the 3D printer at a second angle to provide material adjacent to the second side wall surface based at least in part on the determined second angular orientation, wherein the first and second angles are different; and
determining portions of the generated instructions effective for rotating the deposition axis of the deposition head of the 3D printer at intermediate angles between the first angle and the second angle to deposit material along a deposition path between the first and second side wall surfaces that is not a wall surface, based at least in part on interpolating between the first angle and the second angle for positions along the deposition path between the first and second side wall surfaces that are not wall surfaces, and such that the deposition head of the 3D printer continuously deposits material along the deposition path from the first side wall surface, to between the first and second side wall surfaces, and to the second side wall surface at the first angle, the intermediate angles, and the second angle respectively.

10. The method according to claim 9, further comprising through operation of the at least one processor:
saving the instructions to a storage device in operative connection with the at least one processor.

11. The method according to claim 10, further comprising:
receiving the instructions with a controller associated with the 3D printer, wherein the 3D printer includes the deposition head and a build plate on which the article is built;
through operation of the controller responsive to the instructions, causing the deposition head to rotate so as to provide material adjacent to the first side wall surface while a deposition axis of the deposition head is angularly aligned or substantially angularly aligned with the first angular orientation of the first side wall surface.

12. The method according to claim 10, wherein the instructions are generated in a G-code format.

13. The method according to claim 9, wherein the generated instructions specify a plurality of successive layers for which material is applied to build the article, wherein the first side wall surface is positioned in the same layer as the second side wall surface.

14. The method according to claim 9, wherein the generated instructions specify a plurality of successive layers for which material is applied to build the article, wherein the first side wall surface is positioned in a first layer and the second side wall surface is positioned in a second layer that is positioned outwardly of the first layer relative to the build plate.

15. A non-transitory computer readable medium encoded with executable instructions that when executed by at least one processor, cause the at least one processor to carry out a method comprising:
generating instructions usable by a 3D printer to build an article that specify that a deposition head of the 3D printer deposits material in a plurality of successive layers to form a first side wall surface and a second side wall surface of the article, including:
receiving a 3D model of the article;
determining a first angular orientation of the first side wall surface of the article from the 3D model as an average of two or more angles at portions of the first wall surface;
determining portions of the generated instructions effective for rotating a deposition axis of the deposition head of the 3D printer at a first angle to provide material adjacent to the first side wall surface based at least in part on the determined first angular orientation;
determining a second angular orientation of the second side wall surface of the article from the 3D model;
determining portions of the generated instructions effective for rotating the deposition axis of the deposition head of the 3D printer at a second angle to provide material adjacent to the second side wall surface based at least in part on the determined second angular orientation, wherein the first and second angles are different; and
determining portions of the generated instructions effective for rotating the deposition axis of the deposition head of the 3D printer at intermediate angles between the first angle and the second angle to deposit material along a deposition path between the first and second side wall surfaces that is not a wall surface, based at least in part on interpolating between the first angle and the second angle for positions along the deposition path between the first and second side wall surfaces, and such that the deposition head of the 3D printer continuously deposits material along the deposition path from the first side wall surface, to between the first and second side wall surfaces, and to the second side wall surface at the first angle, the intermediate angles, and the second angle respectively.

* * * * *